US009569136B2

(12) United States Patent
Fang et al.

(10) Patent No.: US 9,569,136 B2
(45) Date of Patent: Feb. 14, 2017

(54) SMART LOAD BALANCING REPLICATION WHEN ADDING OR REMOVING STORAGE DISKS IN A DISTRIBUTED STORAGE SYSTEM

(71) Applicant: International Business Machines Corporation, Armonk, NY (US)

(72) Inventors: Liang Fang, Shanghai (CN); Jie P. Wu, Shanghai (CN); Jun W. Zhang, Shanghai (CN); Xiao D. Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 14/699,494

(22) Filed: Apr. 29, 2015

(65) Prior Publication Data
US 2016/0321008 A1 Nov. 3, 2016

(51) Int. Cl.
*G06F 3/06* (2006.01)
*G06F 13/38* (2006.01)

(52) U.S. Cl.
CPC ............ *G06F 3/0647* (2013.01); *G06F 3/061* (2013.01); *G06F 3/0683* (2013.01)

(58) Field of Classification Search
None
See application file for complete search history.

(56) References Cited

U.S. PATENT DOCUMENTS

| 7,587,569 | B2 | 9/2009 | Uppala |
| 7,721,043 | B2 | 5/2010 | Gill et al. |
| 8,290,919 | B1 | 10/2012 | Kelly |
| 8,484,356 | B1 | 7/2013 | Douglis et al. |
| 8,539,139 | B1 | 9/2013 | Morris |

(Continued)

FOREIGN PATENT DOCUMENTS

| CN | 1375771 A | 10/2002 |
| CN | 1968187 A | 5/2007 |

(Continued)

OTHER PUBLICATIONS

List of IBM Patents or Patent Applications Treated as Related (Appendix P), Jul. 8, 2015, 2 pages.

(Continued)

*Primary Examiner* — Scott Sun
(74) *Attorney, Agent, or Firm* — Francis Lammes; Stephen J. Walder, Jr.; Randall J. Bluestone

(57) ABSTRACT

A mechanism is provided for balancing workload to one or more storage disks in a plurality of storage disks during redistribution or replication associated with adding or removing a storage disk to the plurality of storage disks. Historical information in collected information from the plurality of storage disks is analyzed to identify I/O operation patterns on a per storage disk level. An average amount of I/O operations that occur within each storage disk for a given time period are identified. For each storage disk that is impacted, a disk on/off-hoarding plan is generated that identifies a subset of I/O operations from a set of I/O operations to execute in the given time period using the average amount of I/O operations that historically occur within the storage disk that is impacted during the given time period. The subset of I/O operations are then executed in the given time period.

20 Claims, 7 Drawing Sheets

(56) References Cited

U.S. PATENT DOCUMENTS

| | | |
|---|---|---|
| 8,554,996 B2 | 10/2013 | Long et al. |
| 8,850,153 B2 | 9/2014 | Tressler et al. |
| 8,868,875 B2 | 10/2014 | Tressler et al. |
| 8,886,781 B2 | 11/2014 | Jain et al. |
| 9,058,114 B2 | 6/2015 | Tressler et al. |
| 2005/0071550 A1 | 3/2005 | Lowe et al. |
| 2006/0224825 A1 | 10/2006 | Mogi et al. |
| 2007/0050684 A1 | 3/2007 | Takaoka et al. |
| 2008/0091916 A1 | 4/2008 | Hashemi |
| 2008/0126724 A1 | 5/2008 | Danilak |
| 2008/0140918 A1 | 6/2008 | Sutardja |
| 2009/0198874 A1 | 8/2009 | Tzeng |
| 2009/0287880 A1 | 11/2009 | Wright et al. |
| 2011/0004722 A1 | 1/2011 | Jeddeloh |
| 2011/0010514 A1 | 1/2011 | Benhase et al. |
| 2011/0099320 A1 | 4/2011 | Lucas et al. |
| 2012/0047320 A1 | 2/2012 | Han et al. |
| 2013/0086302 A1 | 4/2013 | Tressler et al. |
| 2015/0143167 A1* | 5/2015 | Maeda ................ G06F 11/2094 714/6.22 |
| 2016/0011796 A1* | 1/2016 | Fujii ....................... G06F 13/10 711/114 |

FOREIGN PATENT DOCUMENTS

| | | |
|---|---|---|
| WO | WO 97/07462 | 2/1997 |
| WO | WO2009047855 A1 | 4/2009 |

OTHER PUBLICATIONS

Combined Search and Examination Report, dated Dec. 21, 2012, Application No. GB1215925.7, 5 pages.

List of IBM Patents or Patent Applications Treated as Related (Appendix P), 2 pages.

Bisson, Timothy et al., "A Hybrid Disk-Aware Spin-Down Algorithm with I/O Subsystem Support", IEEE Xplore, IPCCC'07, downloaded Jun. 24, 2010, pp. 236-245.

Lim, Harold C. et al., "Automated Control for Elastic Storage", Proceedings of the 7th International Conference on Autonomic Computing, Washington, DC, USA Jun. 7-11, 2010, pp. 1-10.

* cited by examiner

600

| TIME PERIOD / STORAGE DISK | TIME PERIOD T$_1$ | TIME PERIOD T$_2$ | ... | TIME PERIOD T$_n$ |
|---|---|---|---|---|
| STORAGE DISK 1 | 150,000 | 40,000 | ... | 80,000 |
| STORAGE DISK 2 | 100,000 | 200,000 | ... | 30,000 |
| ⋮ | ⋮ | ⋮ | | ⋮ |
| STORAGE DISK N | 20,000 | 150,000 | ... | 100,000 |

| I/O OPS / STORAGE DISK | LEVEL 1 I/O OPERATIONS | LEVEL 2 I/O OPERATIONS |
|---|---|---|
| STORAGE DISK 1 | 20,000 | 40,000 |
| STORAGE DISK 2 | 30,000 | 50,000 |
| ⋮ | ⋮ | ⋮ |
| STORAGE DISK N | 25,000 | 15,000 |

*FIG. 7*

SMART LOAD BALANCING REPLICATION WHEN ADDING OR REMOVING STORAGE DISKS IN A DISTRIBUTED STORAGE SYSTEM

BACKGROUND

The present application relates generally to an improved data processing apparatus and method and more specifically to mechanisms for smart load balancing replication when adding or removing storage disks in a distributed storage system.

Current distributed storage technology, such as OpenStack® Swift, Hadoop Distributed File System (HDFS), or the like, generates massive production use of commodity storage disk drives (e.g. Serial ATA (SATA) disks) in cloud-based, social, and mobile applications, some of which store billions of photos per day. To prevent data loss in case of storage disk failures, which happens more on commodity storage disk drives than traditional high-performance storage disk drives (e.g., Serial Attached SCSI (SAS) disks), replication of objects is commonly used to store multiple copies of the object onto different storage disks that are physically separated by nodes, rack, sites, or the like. For example, FIG. 1 depicts an exemplary data distribution system using current distributed storage technology. In data distribution system 102, data distribution ring 104 comprises storage disks 106a-106n. To prevent from data loss in case of a failure in one of storage disks 106a-106n, data distribution ring 104 replicates objects onto two or more of storage disks 106a-106n. For example, object 108a is replicated onto storage disk 106a, storage disk 106b, and storage disk 106n; object 108b is replicated onto storage disk 106a and storage disk 106b; and object 108n is replicated onto storage disk 106a and storage disk 106n. When a new disk is added, such as new storage disk 120, to prevent from data loss in case of a failure in one of storage disks 106a-106n and new storage disk 120, new data distribution ring 114 replicates objects onto two or more of storage disks 106a-106n and new storage disk 120. For example, in addition to the previous replication performed by data distribution ring 104, new data distribution ring 114 replicates object 108a, object 108b, and object 108n onto new storage disk 120.

Therefore, when a data distribution system is running out of space, one or more new storage disks may be added to the data distribution system. Likewise, when a data distribution system is shrinking, one or more current storage disks may be removed from the data distribution system. In either instance, as the data placement mechanism in those general distributed system, data store locations need to be re-calculated when storage disks are added or removed with data re-distribution work to occur immediately after among multiple storage disks, this process sometimes will run for many hours according to the capacity.

However, the issues with a data distribution system, such as that depicted in FIG. 1, if there is real-time application input/output (I/O) occurring or going to occur on the same source or target storage disk of existing data that is being redistributed based on the addition or removal of a storage disk. Since bandwidth of those storage disks are occupied by the redistribution work, the real-time application I/O is impacted. Further, existing data on one or more of the storage disks may be in dangerous situation, such as only one replica is left because of one or more bad storage disks. Thus, if replication of the existing data is not performed onto new storage disks immediately, a risk of data loss may exist. So simply holding all backend re-distribution or replication work until little or no I/O work is occurring is not a good solution.

SUMMARY

In one illustrative embodiment, a method, in a data processing system, is provided for balancing workload to one or more storage disks in a plurality of storage disks during redistribution or replication associated with adding or removing a storage disk to the plurality of storage disks. The illustrative embodiment analyzes historical information in collected information to identify I/O operation patterns on a per storage disk level utilizing the collected information for the plurality of storage disks. The illustrative embodiment determines an average amount of I/O operations that occur within each storage disk in the plurality of storage disks for a given time period. For each storage disk that is impacted based on the adding or removing of the storage disk to the plurality of storage disks, the illustrative embodiment generates a disk on/off-boarding plan that identifies a subset of I/O operations from a set of I/O operations associated with the adding or removing of the storage disk to the plurality of storage disks to execute in the given time period using the average amount of I/O operations that historically occur within the storage disk that is impacted during the given time period and executes the subset of I/O operations in the given time period. Additionally, the illustrative embodiments execute external I/O operations from one or more applications alongside the set of I/O operations during the given time period. Thus, the illustrative embodiments execute a disk on/off-boarding plan in a manner that distinguishes workload types which are from external user or from internal data movement in order to provide better I/O operation optimization.

In the illustrative embodiments, the set of operations comprises level 1 object operations (Level1IO) that are urgent to be moved or replicated and level 2 object operations (Level2IO) that are lower priority for replication or migration. The level 1 object operations (Level1IO) that are part of the set of I/O operations for the given time period $T_i$ are identified using:

$$Level1IO_{T_i} = \max(Weightlevel1 * MaxBandwidth_{T_i}, MaxBandwidth_{T_i} - DeltaIO_{T_{i-1}} - AvgIO_{T_i})$$

where Weightlevel1 is a configurable number, $AvgIO_{T_i}$ is the historical average I/O operations performed on the storage disk that is impacted during the given time period $T_i$, $MaxBandwidth_{T_i}$ is the maximum workload bandwidth of the storage disk that is impacted during the time period $T_i$, and $DeltaIO_{T_{i-1}}$ are the delta external I/O operations that did not finish in a previous time period on the storage disk that is impacted. The level 2 object operations (Level2IO) that are part of the set of I/O operations for the given time period $T_i$ are identified using:

$$Level2IO_{T_i} = \max(Weightlevel2 * MaxBandwidth_{T_i}, MaxBandwidth_{T_i} - Level1IO_{T_i} - DeltaIO_{T_{i-1}} - AvgIO_{T_i})$$

where Weightlevel2 is a configurable number, $AvgIO_{T_i}$ is the historical average I/O operations performed on the storage disk that is impacted during the given time period $T_i$, $MaxBandwidth_{T_i}$ is the maximum workload bandwidth of the storage disk that is impacted during the time period $T_i$, $DeltaIO_{T_{i-1}}$ are the delta external I/O operations that did not finish in a previous time period on the storage disk that is impacted, and $Level1IO_{T_i}$ are the level 1 operations that are to be performed in the given time period. Therefore, the illustrative embodiments consider data availability when moving data, so that the data with less number of copies have higher priority to be distributed to peer storage devices.

Further, for each storage disk that is impacted based on the adding or removing of the storage disk to the plurality of storage disks, the illustrative embodiments generate a revised disk on/off-boarding plan that identifies another subset of I/O operations from a set of I/O operations associated with the adding or removing of the storage disk to the plurality of storage disks to execute in a next time period using the average amount of I/O operations that occur historically within the storage disk that is impacted during the next time period, in response to a failure to complete all of the set of I/O operations associated with the adding or removing of the storage disk to the plurality of storage disks to execute in the given time period; and execute the other subset of I/O operations in the given time period. Thus, the illustrative embodiments forecasts workloads so that data movement may be adjusted more efficiently and both the source and the destination of internal data movement are considered when throttling I/O operations in order to more efficiently balance I/O operations.

In the illustrative embodiments, the collected information comprises one or more of whether an I/O operation is from an external user of an internal component, whether the I/O operation is a read I/O operation or a write I/O operation; a time that the I/O operation was initialized; a length of time required to execute the I/O operation; or a type of storage disk upon which the I/O operation is being performed on a per storage disk basis for the plurality of storage disks.

In other illustrative embodiments, a computer program product comprising a computer useable or readable medium having a computer readable program is provided. The computer readable program, when executed on a computing device, causes the computing device to perform various ones of, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more, processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 depicts an exemplary I/O pattern table illustrating, for each storage disk, an average number of I/O operations performed for each predetermined time period in accordance with an illustrative embodiment;

FIG. 7 depicts an exemplary I/O operations table illustrating, for each storage disk, both the number of level 1 I/O operations that will need to be performed and the number of level 2 I/O operations that need to be performed due to the addition or removal of a storage disk from the plurality of storage disks in accordance with an illustrative embodiment;

DETAILED DESCRIPTION

Figure 1:
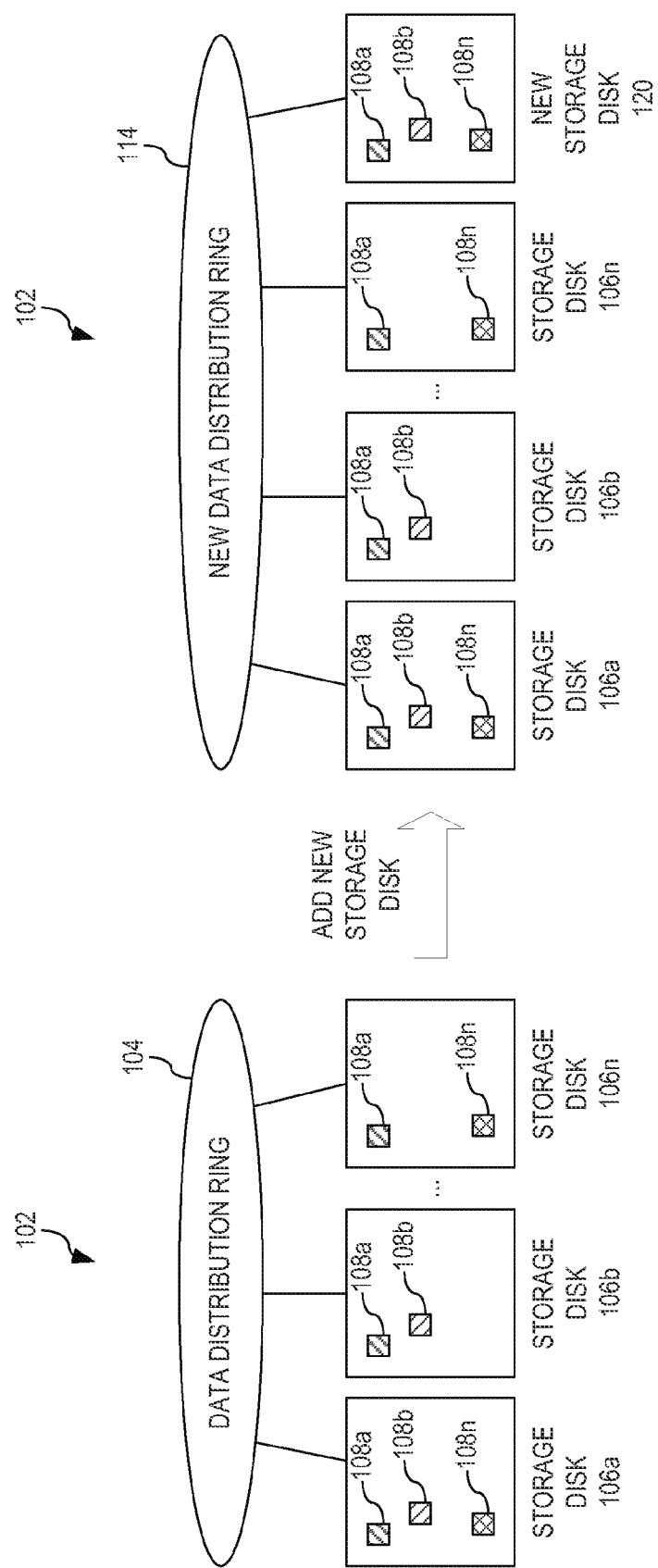
FIG. 1 depicts an exemplary data distribution system using current distributed storage technology.

The illustrative embodiments provide mechanisms for smart load balancing replication when adding or removing storage disks in a distributed storage system. That is, the mechanisms collect application input/output (I/O) operation patterns of storage disks in the distributed storage system and then use those collected application I/O operation patterns to predict and dynamically adjust the backend redistribution or replication work with the real-time application I/O work when adding new storage disks into the distributed storage system or removing storage disks from the distributed storage system. Thus, the mechanisms provide for smart workload balancing through which data migration for source and target storage disks are managed based on previous application I/O operation patterns on those storage disks when performing storage disk on-boarding (i.e., adding a storage disk) or off-boarding (i.e., removing a storage disk).

For example, in one embodiment, the smart workload balancing mechanism monitors various types of workloads, i.e., I/O operations, which are either from external user, such as application I/Os, or from internal data movement, such as replication, redistribution, or migration I/Os, that are being executed on each of the storage disks in the distributed storage system. As the monitoring occurs, the smart workload balancing mechanism collects I/O data, such as whether an I/O operation is from an external user of an internal component, whether the I/O operation is a read I/O operation or a write I/O operation, a time that the I/O operation was initialized, a length of time required to execute the I/O operation, a type of storage disk upon which the I/O operation is being performed on a per storage disk basis for the plurality of storage disks, or the like. The smart workload balancing mechanism then analyzes the data associated with those historical I/O operations that are generated by external users. Utilizing the analysis, the smart workload balancing mechanism generates I/O operation patterns for each storage disk that is indicative of the frequency of I/O operations on the storage disk during different time periods, as well as the amount of I/O operations being performed on the storage disk during those time periods. Utilizing the generated patterns for each storage disk, the smart workload balancing mechanism may then throttle further I/O operations generated by internal data movement when adding or removing storage disks to or from the distributed storage system, so that the incurred bandwidth competition to the workload from external user is controlled in an optimized way. Furthermore, the smart workload balancing mechanism may utilize characteristics associated with each of the storage disks when throttling the I/O operations, since a solid-state drive (SSD) has a much larger bandwidth than a hard disk drive (HDD).

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
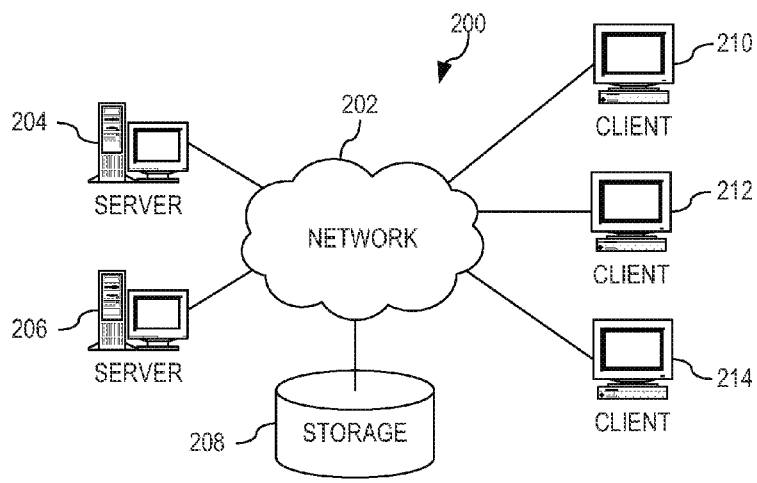
FIG. 2 is an example diagram of a distributed data processing system in which aspects of the illustrative embodiments may be implemented.
Figure 3:
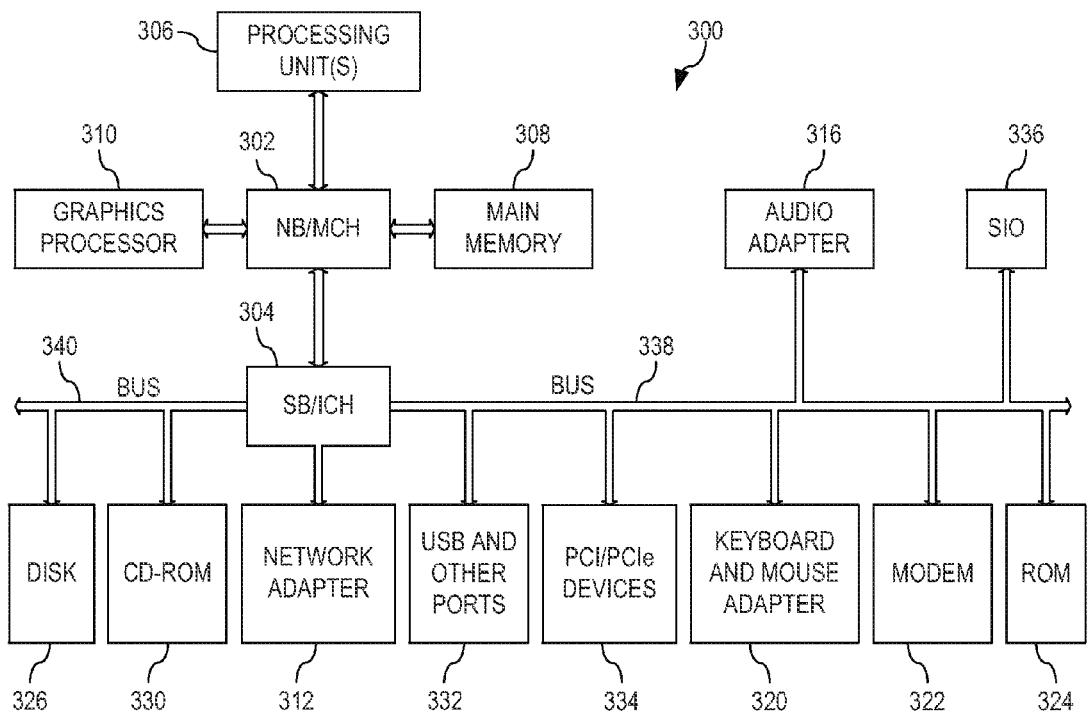
FIG. 3 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 2 and 3 are provided hereafter as example environments in which aspects of the illustrative embodiments may be implemented. It should be appreciated that FIGS. 2 and 3 are only examples and are not intended to assert or imply any limitation with regard to the environments in which aspects or embodiments of the present invention may be implemented. Many modifications to the depicted environments may be made without departing from the spirit and scope of the present invention.

FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

FIG. 3 is a block diagram of an example data processing system in which aspects of the illustrative embodiments may be implemented. Data processing system 300 is an example of a computer, such as client 210 in FIG. 2, in which computer usable code or instructions implementing the processes for illustrative embodiments of the present invention may be located.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 300.

As a server, data processing system 300 may be, for example, an IBM eServer™ System p® computer system, Power™ processor based computer system, or the like, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

Figure 4:
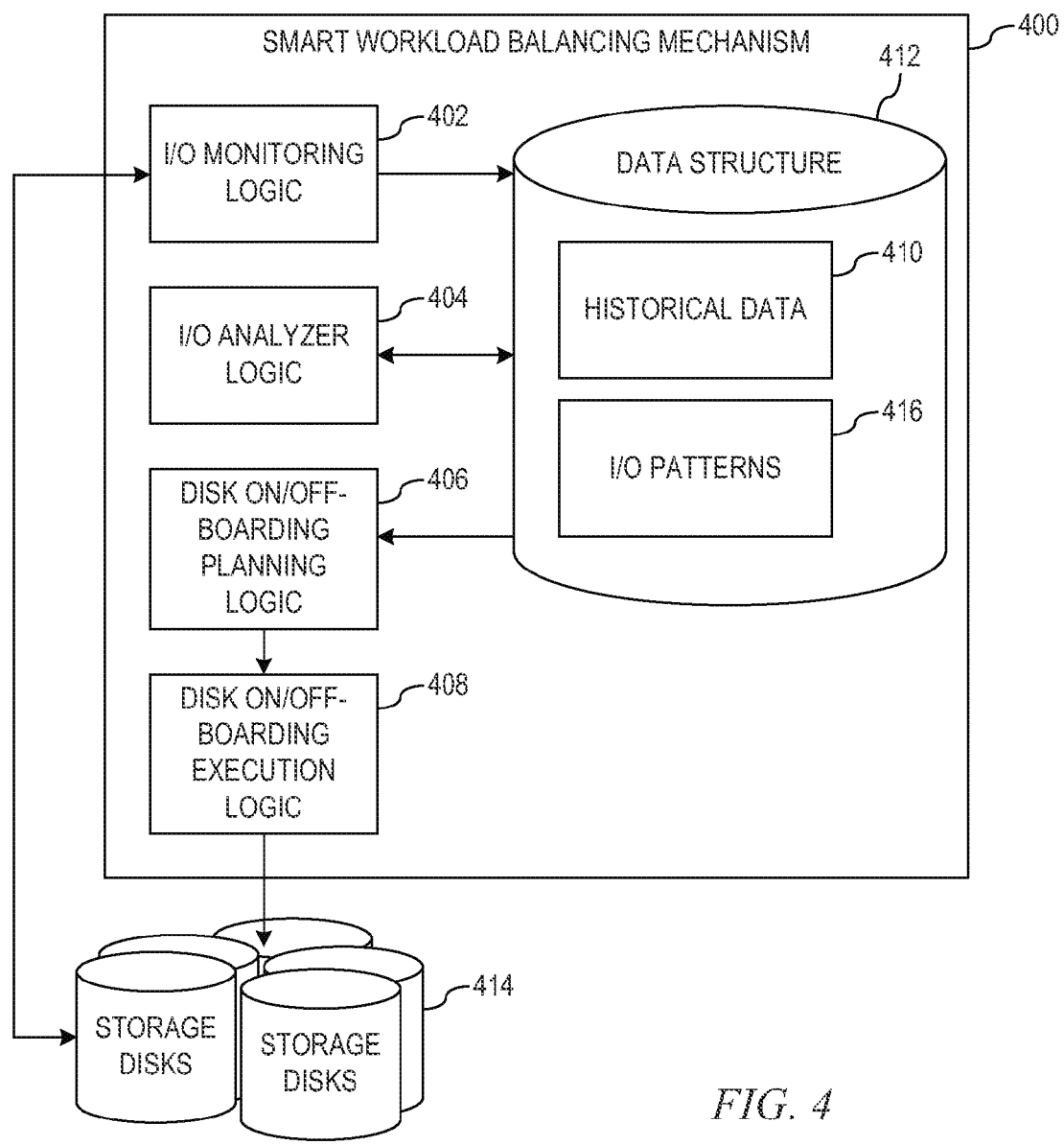
FIG. 4 depicts a functional block diagram of a smart workload balancing mechanism that predicts and dynamically adjusts backend redistribution or replication work with real-time application I/O work when adding new storage disks into a distributed storage system or removing storage disks from the distributed storage system in accordance with one illustrative embodiment.

FIG. 4 depicts a functional block diagram of a smart workload balancing mechanism that predicts and dynamically adjusts backend redistribution or replication work with real-time application I/O work when adding new storage disks into a distributed storage system or removing storage disks from the distributed storage system in accordance with one illustrative embodiment. Smart workload balancing mechanism 400 comprises I/O monitor logic 402, I/O analyzer logic 404, disk on/off-boarding planning logic 406, and disk on/off-boarding execution logic 408. I/O monitoring logic 402 collects information associated with each I/O operation issued to each of a plurality of storage disks 414 and records this information, such as whether the I/O operation was from an external user, such as an application I/O operation, or from an internal component, such as a replication or redistribution I/O operation; whether the I/O operation is a read I/O operation or a write I/O operation; a time that the I/O operation was initialized; a length of time required to execute the I/O operation; a type of storage disk upon which the I/O operation is being performed; or the like, on a per storage disk basis. I/O monitoring logic 402 stores this information in historical data 410 in associated data structure 412. For example, I/O monitoring logic 402 may identify for a particular I/O operation that the I/O operation is from an external user, is a read operation, was executed at 11:06 GMT, lasted for 20 microseconds, and the disk upon which the I/O operation was executed was a solid-state drive.

Figure 5:
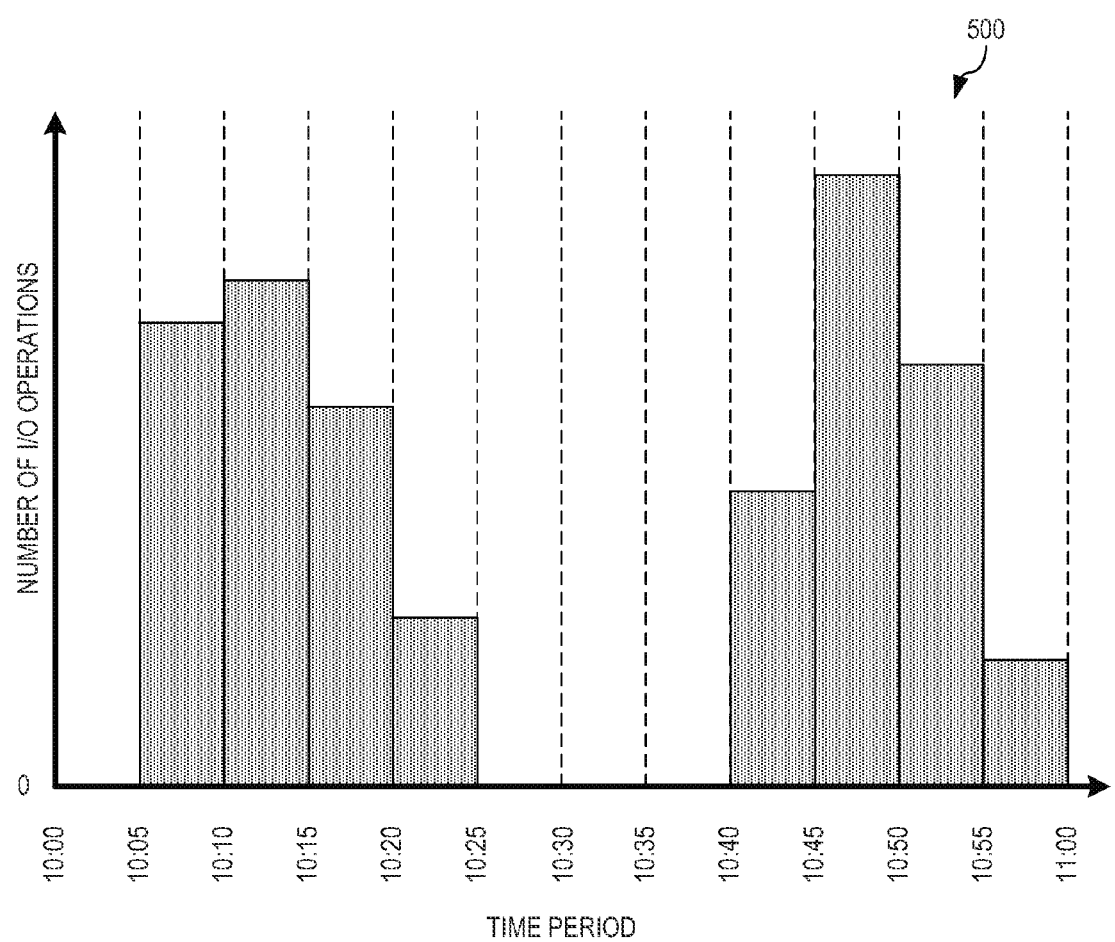
FIG. 5 depicts an I/O operation for a particular storage disk over a one hour time period on five minute time intervals in accordance with an illustrative embodiment.

Utilizing the information collected by I/O monitoring logic 402 for the plurality of storage disks 414 and stored as historical data 410 in data structure 412, I/O analyzer logic 404 analyzes the historical information to identify I/O operation patterns on a per storage disk level. That is, for each storage disk and for a predetermined time period, such as a predetermined number of minutes, hours, days, weeks, or the like, I/O analyzer logic 404 identifies when the I/O operations occur within the time period based on a set of time intervals. For example, FIG. 5 depicts an I/O operation for a particular storage disk over a one hour time period on five minute time intervals in accordance with an illustrative embodiment. As is illustrated in the time I/O operation behavior graph 500 for the particular storage disk, I/O analyzer logic 404 identifies the I/O operations based on the five minute time intervals and the amount of I/O operations for each time interval. Utilizing the identified. I/O operation occurrence for each time interval in the time period and the amount of I/O operations performed during each time interval within the time period, I/O analyzer logic 404 determines an average amount of I/O operations that occur within the storage disk for the given time period utilizing:

$$AvgIO_{Ti} = \sum_{n=1}^{timeperiod\_M} IO_{Ti}/M$$

Therefore, I/O analyzer logic 404 determines the average I/O amount for one storage disk during the given time period I/O analyzer logic 404 repeats this process for each time period and for each storage disk in order to determine the average I/O operations on each storage disk based on the predetermined time period. FIG. 6 depicts an exemplary I/O pattern table 600 illustrating, for each storage disk, an average number of I/O operations performed for each predetermined time period in accordance with an illustrative embodiment. I/O analyzer logic 404 stores the identified I/O operation patterns for each disk and/or group of storage disks as I/O operation patterns 416 in data structure 412.

Once I/O analyzer logic 404 generates I/O operation patterns 416, disk on/off-boarding planning logic 406 generates a disk on/off-boarding plan as to when backend redistribution or replication may occur when one or more new storage disks are added to the plurality of storage disks 414 or when one or more existing storage disks are removed from the plurality of storage disks 414. In order to generate the disk on/off-boarding plan, disk on/off-boarding planning logic 406 identifies the objects, such as one or more of objects 108a-108n of FIG. 1, that will be impacted by the addition or removal of a storage disk. There are two categories of objects that may be replicated or migrated:

1. A single copy object (level 1 object), which is urgent to be moved or replicated; or
2. A multi-copy object (level 2 object), which has lower priority for replication or migration.

Disk on/off-boarding planning logic 406 then identifies the I/O operation patterns from I/O operation patterns 416 for those storage disks where the objects that are impacted reside. No matter if a storage disk is being added or removed, for each storage disk, there are two types of data operations:

1. Data to be moved in; and/or
2. Data to be moved out.

So for each storage disk, the I/O operations to be performed may be identified based on I/O operations to be performed both on level 1 object I/O operations and/or level 2 objection I/O operations. FIG. 7 depicts an exemplary I/O operations table 700 illustrating, for each storage disk, both the number of level 1 I/O operations that will need to be performed and the number of level 2 I/O operations that need to be performed due to the addition or removal of a storage disk from the plurality of storage disks 414 in accordance with an illustrative embodiment.

With the number of I/O operations identified to address the impacted objects, disk on/off-boarding planning logic 406 generates a backend data migration disk on/off-boarding plan. When storage disks are added or removed, the backend data migration occurs. But, at the same time, host side applications are executing and thus, I/O operations may be issued from these external users. Therefore, disk on/off-boarding planning logic 406 identifies the maximum number of I/O operations that may be executed in each cycle on the specific storage disk. For example, a Serial ATA (SATA) storage disk is limited to 120-180 operations per cycle. Thus, disk on/off-boarding planning logic 406 defines the maximum workload bandwidth of a specific storages disk during a period of time as:

$$MaxBandwidth_{Ti} = Disk\_IOPS * T_i$$

So disk on/off-boarding planning logic 406 generates a backend data migration disk on/off-boarding plan that balances the workload of backend migration I/O operations and front end application I/O operations, which are:

1. internal level 1 I/O operations;
2. Internal level 2 I/O operations; and
3. External application I/O operations.

For the internal level 1 I/O operations, as the object is at risky state, the priority can be defined the same as external application I/O. For the internal level 2 I/O operations, the priority is lower than the internal level 1 I/O operations and the external application I/O operations.

Therefore, for each storage disk, during one specific period of time $T_i$, there are several factors to be introduced:

1. $AvgIO_{Ti}$, which is the historical average I/O operations performed on the target storage disk during the time period $T_i$;
2. $MaxBandwidth_{Ti}$, which is the maximum workload bandwidth of the target storage disk during the time period $T_i$; and
3. $DeltaIO_{Ti-1}$, which are the delta external I/O operations that did not finish in the previous cycle on the storage disk.

In order to account for all three of these in a next time period, disk on/off-boarding planning logic 406 determines a number of redistribution or replication I/O operations that may be executed in a next time period on a target storage disk as follows:

For level 1 I/O operations:

$$Level1IO_{Ti} = max(Weightlevel1*MaxBandwidth_{Ti}, MaxBandwidth_{Ti} - DeltaIO_{Ti-1} - AvgIO_{Ti})$$

For level 2 I/O operations:

$$Level2IO_{Ti} = max(Weightlevel2*MaxBandwidth_{Ti}, MaxBandwidth_{Ti} - Level1IO_{Ti} - DeltaIO_{Ti-1} - AvgIO_{Ti})$$

In the above determinations, Weightlevel1 is configurable such that, if the priority of level 1 I/O operations is the same as external application I/O operations, then Weightlevel1=0.5. Further, Weightlevel2 is configurable such that, if the priority of level 2 I/O operations is lower than the internal level 1 I/O operations and the external application I/O operations, Weightlevel2=0, otherwise, Weightlevel2 may be a number like 0.1. Further in accordance with the illustrative embodiments Weightlevel1+Weightlevel2<1. In the illustrative embodiments, disk on/off-boarding planning logic 406 may have to revise the generated disk on/off-boarding plan for as long as redistribution or replication associated with the added or removed storage disk requires. Thus, if the redistribution or replication requires more than one time period, disk on/off-boarding planning logic 406 revises the disk on/off-boarding plan for each subsequent time period that is required to complete the redistribution or replication associated with the addition or removal of a storage disk from the plurality of storage disks.

Based on the determined number of redistribution or replication I/O operations that may be executed in a next time period on a target storage disk, which disk on/off-boarding planning logic 408 may generate a disk on/off-boarding plan for, disk on/off-boarding execution logic 408 executes the disk on/off-boarding plan. In executing the disk on/off-boarding plan in the above described dynamic self-adapting way, the illustrative embodiments distinguishes workload types which are from external user or from internal data movement, so that the smart workload balancing mechanism provides better I/O operation optimization that distinguished over prior arts that do not distinguish workloads at all. The smart workload balancing mechanism of the illustrative embodiments also considers the data availability when moving data, so that the data with less number of copies have higher priority to be distributed to peer storage devices, forecasts workloads so that the smart workload balancing mechanism may adjust data movement more efficiently, and considers both the source and the destination of internal data movement when throttling I/O operations in order to more efficiently balance I/O operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
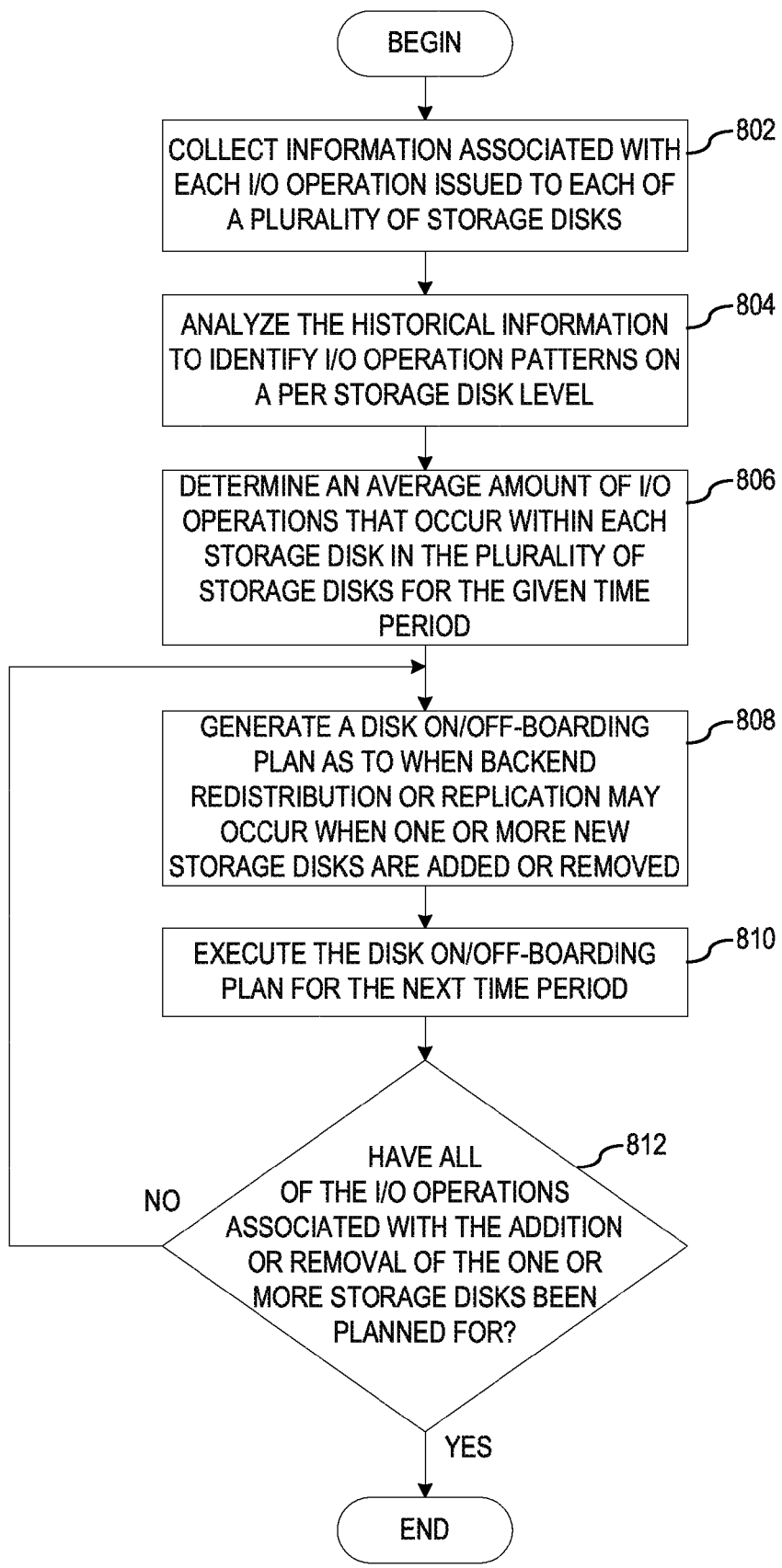
FIG. 8 depicts the operation of a smart workload balancing mechanism that predicts and dynamically adjusts backend redistribution or replication work with real-time application I/O work when adding new storage disks into a distributed storage system or removing storage disks from the distributed storage system in accordance with an illustrative embodiment.

FIG. 8 depicts the operations of a smart workload balancing mechanism that predicts and dynamically adjusts backend redistribution or replication work with real-time application I/O work when adding new storage disks into a distributed storage system or removing storage disks from the distributed storage system in accordance with an illustrative embodiment. As the operation begins, the smart workload balancing mechanism collects information associated with each I/O operation issued to each of a plurality of storage disks (step 802). The smart workload balancing mechanism records this information, such as whether the I/O operation was from an external user, such as an application I/O operation, or from an internal component, such as a replication or redistribution I/O operation; whether the I/O operation is a read I/O operation or a write I/O operation; a time that the I/O operation was initialized; a length of time required to execute the I/O operation; a type of storage disk upon which the I/O operation is being performed; or the like, on a per storage disk basis in an historical data structure.

Utilizing the collected information for the plurality of storage disks, the smart workload balancing mechanism analyzes the historical information to identify I/O operation patterns on a per storage disk level (step 804). That is, for each storage disk and for a predetermined time period, such as a predetermined number of minutes, hours, days, weeks, or the like, the smart workload balancing mechanism identifies when the I/O operations occur within the time period based on a set of time intervals. Utilizing the identified I/O operation occurrence for each time interval in the time period and the amount of I/O operations performed during each time interval within the time period, the smart workload balancing mechanism determines an average amount of I/O operations that occur within each storage disk in the plurality of storage disks for the given time period (step 806) utilizing:

$$AvgIO_{Ti} = \sum_{n=1}^{timeperiod\_M} IO_{Ti}/M$$

With the generated I/O operation patterns, the smart workload balancing mechanism generates a disk on/off-boarding plan as to when backend redistribution or replication may occur when one or more new storage disks are added to the plurality of storage disks or when one Or more existing storage disks are removed from the plurality of storage disks (step 808). Based on the determined number of redistribution or replication I/O operations that may be executed in a next time period on a target storage disk, the smart workload balancing mechanism executes the disk on/off-boarding plan for the next time period (step 810). The smart workload balancing mechanism then determines whether all of the I/O operations associated with the addition or removal of the one or more storage disks in the plurality of storage disks have been planned for (step 812). If at step 812 all of the I/O operations have not completed, then the operation returns to step 808. If at step 812 all of the I/O operations have completed, the operation terminates.

Figure 9:
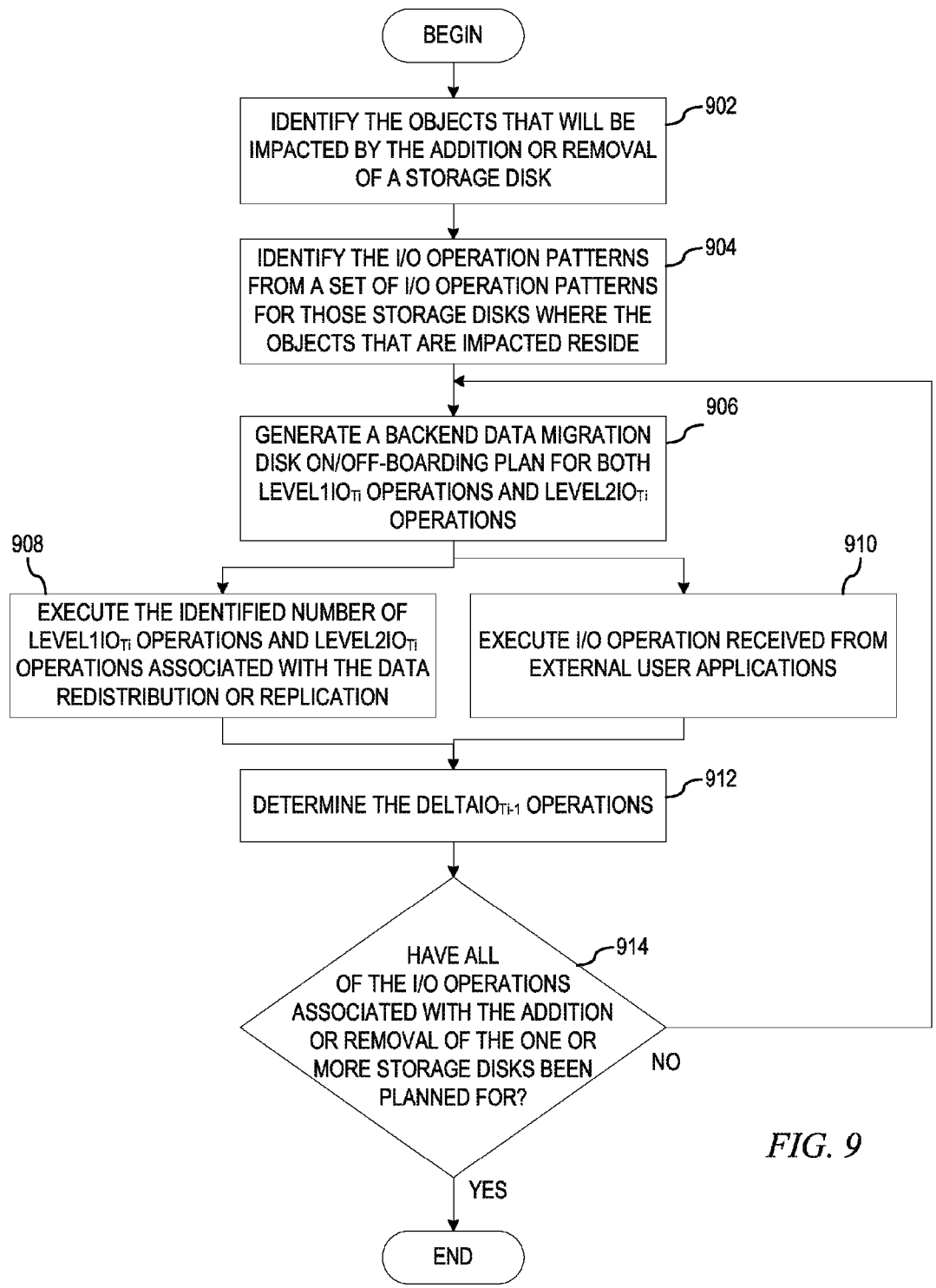
FIG. 9 depicts the operations of a smart workload balancing mechanism in generating the disk on/off-boarding plan in accordance with an illustrative embodiment.

FIG. 9 depicts the operations of a smart workload balancing mechanism in generating the disk on/off-boarding plan of step 808 in FIG. 8 in accordance with an illustrative embodiment. As the operation begins, the smart workload balancing mechanism identifies the objects that will be impacted by the addition or removal of a storage disk (step 902). There are two categories of objects that may be replicated or migrated:

1. A single copy object (level 1 object), which is urgent to be moved or replicated; or
2. A multi-copy object (level 2 object), which has lower priority for replication or migration.

The smart workload balancing mechanism identifies the I/O operation patterns from a set of I/O operation patterns for those storage disks where the objects that are impacted reside (step 904). So for each storage disk, the I/O operations to be performed may be identified based on I/O operations to be performed both on a level 1 object I/O operations and/or level 2 objection I/O operations. With the number of I/O operations identified to address the impacted objects, the smart workload balancing mechanism generates a backend data migration disk on/off-boarding plan by calculating both Level1IO$_{Ti}$ operations that can be performed during the next time period and the Level2IO$_{Ti}$ operations that can be performed during the next time period (step 906) using:

Level1IO$_{Ti}$=max(Weightlevel1*MaxBandwidth$_{Ti}$, MaxBandwidth$_{Ti}$-DeltaIO$_{Ti-1}$-AvgIO$_{Ti}$)

For level 2 I/O operations:

Level2IO$_{Ti}$=max(Weightlevel2*MaxBandwidth$_{Ti}$, MaxBandwidth$_{Ti}$-Level1IO$_{Ti}$-DeltaIO$_{Ti-1}$-AvgIO$_{Ti}$)

In the above determinations, Weightlevel1 is configurable such that, if the priority of level 1 I/O operations is the same as external application I/O operations, then Weightlevel1=0.5. Further, Weightlevel1 is configurable such that, if the priority of level 2 I/O operations is lower than the internal level 1 I/O operations and the external application I/O operations, Weightlevel2=0, otherwise, Weightlevel2 may be a number like 0.1. Further, in accordance with the illustrative embodiments Weightlevel1+Weightlevel2<1.

In the above determinations, AvgIO$_{Ti}$ is the historical average I/O operations performed on the target storage disk during the time period MaxBandwidth$_{Ti}$ is the maximum workload bandwidth of the target storage disk during the time period T$_i$, DeltaIO$_{Ti-1}$ are the delta external I/O operations that did not finish in the previous cycle on the storage disk.

With the Level1IO$_{Ti}$ operations and the Level2IO$_{Ti}$ operations determined, the smart workload balancing mechanism executes the identified number of Level1IO$_{Ti}$ operations and the Level2IO$_{Ti}$ operations associated with the data redistribution or replication (step 908) alongside any I/O operation received from external user applications (step 910). At the end of the time period, the smart workload balancing mechanism determines the DeltaIO$_{Ti-1}$ operations, which are the delta external I/O operations that did not finish in the previous cycle on the storage disk (step 912).

The smart workload balancing mechanism then determines whether all of the I/O operations associated with the addition or removal of the one or more storage disks in the plurality of storage disks have been planned for (step 914). If at step 914 all of the I/O operations have not completed, then the operation returns to step 906. If at step 914 all of the I/O operations have completed, the operation terminates.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for smart load balancing replication when adding or removing storage disks in a distributed storage system. Application I/O operation patterns of storage disks in the distributed storage system are collected and then used to predict and dynamically adjust the backend redistribution or replication work with the real-time application I/O work when adding new storage disks into the distributed storage system or removing storage disks from the distributed storage system. Utilizing the application I/O operation patterns provides for smart workload balancing through which data migration for source and target storage disks are managed based on previous application I/O operation patterns on those storage disks when performing storage disk on-boarding (i.e., adding a storage disk) or off-boarding (i.e., removing a storage disk).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for balancing workload to one or more storage disks in a plurality of storage disks during redistribution or replication associated with adding or removing a storage disk to the plurality of storage disks, the method comprising:
utilizing collected information for the plurality of storage disks, analyzing historical information in the collected information to identify I/O operation patterns on a per storage disk level;
determining an average amount of I/O operations that occur within each storage disk in the plurality of storage disks for a given time period; and
for each storage disk that is impacted based on the adding or removing of the storage disk to the plurality of storage disks:
generating a disk on/off-boarding plan that identifies a subset of I/O operations from a set of I/O operations associated with the adding or removing of the storage disk to the plurality of storage disks to execute in the given time period using the average amount of I/O operations that historically occur within the storage disk that is impacted during the given time period; and
executing the subset of I/O operations in the given time period.

2. The method of claim 1, further comprising:
executing external I/O operations from one or more applications alongside the set of I/O operations during the given time period.

3. The method of claim 1, wherein the set of I/O operations comprises level 1 object operations (Level1IO) that are urgent to be moved or replicated and level 2 object operations (Level2IO) that are lower priority for replication or migration.

4. The method of claim 3, wherein the level 1 object operations (Level1IO) that are part of the set of I/O operations for the given time period $T_i$ are identified using:

$$Level1IO_{T_i} = \max(Weightlevel1 * MaxBandwidth_{T_i}, MaxBandwidth_{T_i} - DeltaIO_{T_{i-1}} - AvgIO_{T_i})$$

where Weightlevel1 is a configurable number, $AvgIO_{T_i}$ is the historical average I/O operations performed on the storage disk that is impacted during the given time period $T_i$, $MaxBandwidth_{T_i}$ is the maximum workload bandwidth of the storage disk that is impacted during the time period $T_i$, and $DeltaIO_{T_{i-1}}$ are the delta external I/O operations that did not finish in a previous time period on the storage disk that is impacted.

5. The method of claim 3, wherein the level 2 object operations (Level2IO) that are part of the set of I/O operations for the given time period $T_i$ are identified using:

$$Level2IO_{T_i} = \max(Weightlevel2 * MaxBandwidth_{T_i}, MaxBandwidth_{T_i} - Level1IO_{T_i} - DeltaIO_{T_{i-1}} - AvgIO_{T_i})$$

where Weightlevel2 is a configurable number, $AvgIO_{T_i}$ is the historical average I/O operations performed on the storage disk that is impacted during the given time period $T_i$, $MaxBandwidth_{T_i}$ is the maximum workload bandwidth of the storage disk that is impacted during the time period $T_i$, $DeltaIO_{T_{i-1}}$ are the delta external I/O operations that did not finish in a previous time period on the storage disk that is impacted, and $Level1IO_{T_i}$ are the level 1 operations that are to be performed in the given time period.

6. The method of claim 1, further comprising:
for each storage disk that is impacted based on the adding or removing of the storage disk to the plurality of storage disks:
responsive to a failure to complete all of the set of I/O operations associated with the adding or removing of the storage disk to the plurality of storage disks to execute in the given time period, generating a revised disk on/off-boarding plan that identifies another subset of I/O operations from a set of I/O operations associated with the adding or removing of the storage disk to the plurality of storage disks to execute in a next time period using the average amount of I/O operations that occur historically within the storage disk that is impacted during the next time period; and executing the other subset of I/O operations in the given time period.

7. The method of claim 1, wherein the collected information comprises one or more of whether an I/O operation is from an external user of an internal component, whether the I/O operation is a read I/O operation or a write I/O operation; a time that the I/O operation was initialized; a length of time required to execute the I/O operation; or a type of storage disk upon which the I/O operation is being performed on a per storage disk basis for the plurality of storage disks.

8. A computer program product comprising a computer readable storage medium having a computer readable program stored therein, wherein the computer readable program, when executed on a computing device, causes the computing device to:

utilizing collected information for a plurality of storage disks, analyze historical information in the collected information to identify I/O operation patterns on a per storage disk level;

determine an average amount of I/O operations that occur within each storage disk in the plurality of storage disks for a given time period; and for each storage disk that is impacted based on the adding or removing of the storage disk to the plurality of storage disks:

generate a disk on/off-boarding plan that identifies a subset of I/O operations from a set of I/O operations associated with the adding or removing of the storage disk to the plurality of storage disks to execute in the given time period using the average amount of I/O operations that historically occur within the storage disk that is impacted during the given time period; and execute the subset of I/O operations in the given time period.

9. The computer program product of claim 8, wherein the computer readable program further causes the computing device to:

execute external I/O operations from one or more applications alongside the set of operations during the given time period.

10. The computer program product of claim 8, wherein the set of I/O operations comprises level 1 object operations (Level1IO) that are urgent to be moved or replicated and level 2 object operations (Level2IO) that are lower priority for replication or migration.

11. The computer program product of claim 10, wherein the level 1 object operations (Level1IO) that are part of the set of I/O operations for the given time period $T_i$ are identified using:

$$Level1IO_{Ti} = max(Weightlevel1 * MaxBandwidth_{Ti}, MaxBandwidth_{Ti} - DeltaIO_{Ti-1} - AvgIO_{Ti})$$

where Weightlevel1 is a configurable number, $AvgIO_{Ti}$ is the historical average I/O operations performed on the storage disk that is impacted during the given time period $T_i$, $MaxBandwidth_{Ti}$ is the maximum workload bandwidth of the storage disk that is impacted during the time period $T_i$, and $DeltaIO_{Ti-1}$ are the delta external I/O operations that did not finish in a previous time period on the storage disk that is impacted.

12. The computer program product of claim 10, wherein the level 2 object operations (Level2IO) that are part of the set of I/O operations for the given time period $T_i$ are identified using:

$$Level2IO_{Ti} = max(Weightlevel2 * MaxBandwidth_{Ti}, MaxBandwidth_{Ti} - Level1IO_{Ti} - DeltaIO_{Ti-1} - AvgIO_{Ti})$$

where Weightlevel2 is a configurable number, $AvgIO_{Ti}$ is the historical average I/O operations performed on the storage disk that is impacted during the given time period $T_i$, $MaxBandwidth_{Ti}$ is the maximum workload bandwidth of the storage disk that is impacted during the time period $T_i$, $DeltaIO_{Ti-1}$ are the delta external I/O operations that did not finish in a previous time period on the storage disk that is impacted, and $Level1IO_{Ti}$ are the level 1 operations that are to be performed in the given time period.

13. The computer program product of claim 8, wherein the computer readable program further causes the computing device to:

for each storage disk that is impacted based on the adding or removing of the storage disk to the plurality of storage disks:

responsive to a failure to complete all of the set of I/O operations associated with the adding or removing of the storage disk to the plurality of storage disks to execute in the given time period, generate a revised disk on/off-boarding plan that identifies another subset of I/O operations from a set of I/O operations associated with the adding or removing of the storage disk to the plurality of storage disks to execute in a next time period using the average amount of I/O operations that occur historically within the storage disk that is impacted during the next time period; and execute the other subset of I/O operations in the given time period.

14. The computer program product of claim 8, wherein the collected information comprises one or more of whether an I/O operation is from an external user of an internal component, whether the I/O operation is a read I/O operation or a write I/O operation; a time that the I/O operation was initialized; a length of time required to execute the I/O operation; or a type of storage disk upon which the I/O operation is being performed on a per storage disk basis for the plurality of storage disks.

15. An apparatus comprising:

a processor; and a memory coupled to the processor, wherein the memory comprises instructions which, when executed by the processor, cause the processor to:

utilizing collected information for a plurality of storage disks, analyze historical information in the collected information to identify I/O operation patterns on a per storage disk level;

determine an average amount of I/O operations that occur within each storage disk in the plurality of storage disks for a given time period; and for each storage disk that is impacted based on the adding or removing of the storage disk to the plurality of storage disks:

generate a disk on/off-boarding plan that identifies a subset of I/O operations from a set of I/O operations associated with the adding or removing of the storage disk to the plurality of storage disks to execute in the given time period using the average amount of I/O operations that historically occur within the storage disk that is impacted during the given time period; and execute the subset of I/O operations in the given time period.

16. The apparatus of claim 15, wherein the instructions further cause the processor to:

execute external I/O operations from one or more applications alongside the set of I/O operations during the given time period.

17. The apparatus of claim 15, wherein the set of I/O operations comprises level 1 object operations (Level1IO) that are urgent to be moved or replicated and level 2 object operations (Level2IO) that are lower priority for replication or migration.

18. The apparatus of claim 17, wherein the level 1 object operations (Level1IO) that are part of the set of I/O operations for the given time period $T_i$ are identified using:

$$\text{Level1IO}_{Ti} = \max(\text{Weightlevel1} * \text{MaxBandwidth}_{Ti}, \text{MaxBandwidth}_{Ti} - \text{DeltaIO}_{Ti-1} - \text{AvgIO}_{Ti})$$

where Weightlevel1 is a configurable number, $\text{AvgIO}_{Ti}$ is the historical average I/O operations performed on the storage disk that is impacted during the given time period $T_i$, $\text{MaxBandwidth}_{Ti}$ is the maximum workload bandwidth of the storage disk that is impacted during the time period $T_i$, and $\text{DeltaIO}_{Ti-1}$ are the delta external I/O operations that did not finish in a previous time period on the storage disk that is impacted.

19. The apparatus of claim 17, wherein the level 2 object operations (Level2IO) that are part of the set of I/O operations for the given time period $T_i$ are identified using:

$$\text{Level2IO}_{Ti} = \max(\text{Weightlevel2} * \text{MaxBandwidth}_{Ti}, \text{MaxBandwidth}_{Ti} - \text{Level1IO}_{Ti} - \text{DeltaIO}_{Ti-1} - \text{AvgIO}_{Ti})$$

where Weightlevel2 is a configurable number, $\text{AvgIO}_{Ti}$ is the historical average I/O operations performed on the storage disk that is impacted during the given time period $T_i$, $\text{MaxBandwidth}_{Ti}$ is the maximum workload bandwidth of the storage disk that is impacted during the time period $T_i$, $\text{DeltaIO}_{Ti-1}$ are the delta external I/O operations that did not finish in a previous time period on the storage disk that is impacted, and $\text{Level1IO}_{Ti}$ are the level 1 operations that are to be performed in the given time period.

20. The apparatus of claim 15, wherein the instructions further cause the processor to:

for each storage disk that is impacted based on the adding or removing of the storage disk to the plurality of storage disks:

responsive to a failure to complete all of the set of I/O operations associated with the adding or removing of the storage disk to the plurality of storage disks to execute in the given time period, generate a revised disk on/off-boarding plan that identifies another subset of I/O operations from a set of I/O operations associated with the adding or removing of the storage disk to the plurality of storage disks to execute in a next time period using the average amount of I/O operations that occur historically within the storage disk that is impacted during the next time period; and execute the other subset of I/O operations in the given time period.

* * * * *